United States Patent [19]

Schoettle et al.

[11] Patent Number: 5,010,434
[45] Date of Patent: Apr. 23, 1991

[54] TAPE CASSETTE HAVING A TWO-REEL BRAKE SYSTEM HAVING IDENTICAL BRAKE LEVERS THEREFOR

[75] Inventors: Klaus Schoettle, Heidelberg; Artur Buhk, Erpolzheim; Lothar Gliniorz, Frankenthal, all of Fed. Rep. of Germany

[73] Assignee: BASF Aktiengesellschaft, Ludwigshafen, Fed. Rep. of Germany

[21] Appl. No.: 338,093

[22] Filed: Apr. 14, 1989

[30] Foreign Application Priority Data

Apr. 23, 1988 [DE] Fed. Rep. of Germany ............. 68805416[U]

[51] Int. Cl.$^5$ ............. G11B 23/02; G11B 15/32
[52] U.S. Cl. ............. 360/132; 360/130.33; 242/198

[58] Field of Search ............. 360/132, 93, 130.33, 360/130.22, 130.21, 137, 96.3, 96.1; 242/198-199, 197, 200-201

[56] References Cited

U.S. PATENT DOCUMENTS

| | | | |
|---|---|---|---|
| 4,288,048 | 9/1981 | Sieben | 242/198 X |
| 4,447,020 | 5/1984 | Toi et al. | 360/132 |
| 4,638,393 | 1/1987 | Oishi et al. | 360/132 X |
| 4,660,115 | 4/1987 | Westfall et al. | 360/132 X |
| 4,660,116 | 4/1987 | Westfall et al. | 360/132 X |
| 4,823,223 | 4/1989 | Hisose et al. | 360/132 X |

Primary Examiner—Robert S. Tupper
Assistant Examiner—Alfonso Garcia
Attorney, Agent, or Firm—Keil & Weinkauf

[57] ABSTRACT

A tape cassette has a two-reel brake system having identical brake levers and an actuating element possessing actuating arms for the brake levers, the actuating arms being arranged at least close to the ends of the swivel axle. The brake system is suitable for all two-reel tape cassettes, in particular video cassettes.

9 Claims, 3 Drawing Sheets

TAPE CASSETTE HAVING A TWO-REEL BRAKE SYSTEM HAVING IDENTICAL BRAKE LEVERS THEREFOR

BACKGROUND OF THE INVENTION AND PRIOR ART

The present invention relates to a tape cassette having a two-reel brake system, essentially consisting of an actuating element and two rotatable brake levers which are coordinated with the reels, spring-mounted on the cassette housing and arranged so that they can be actuated by the actuating element, and the brake system itself and the brake levers for this purpose.

The VHS video cassette having two coplanar reels contains a two-reel brake system which consists of an angular actuating lever, a right brake lever (for the right-hand reel), a left brake lever (for the left-hand reel) and either two individual springs or a common double spring. The right brake lever and left brake lever are mirror images of one another, since the actuation is carried out at actuating arms which are in an upper position with respect to the swivel bush (in the cassette housing), and braking at brake arms in a lower position with respect to the swivel bush (and in the cassette housing) is effected at the lower toothed flanges of the reels.

In practice, the right and left brake levers are of different colors (for example, black and white) to permit stocking and assembly in accordance with specifications. The actuation distance of the actuating arms before the reels are released by the brake arms is relatively long.

OBJECT AND SUMMARY OF THE INVENTION

It is an object of the present invention to make the cassette, the brake system and the individual brake levers substantially cheaper.

We have found that this object is achieved by a tape cassette having a two-reel brake system, essentially consisting of an actuating element and two rotatable brake levers which are coordinated with the reels, spring-mounted on the cassette housing and arranged so that they can be actuated by the actuating element, if the brake levers are of identical shape.

This results in very economical production from one and the same mold, and the special color coding can be dispensed with.

In a practical embodiment, the brake levers consist of a brake extension, an actuating extension and a swivel bush and are symmetrical with respect to the center plane at right angles to the longitudinal axis of the swivel bush.

Advantageously, the actuating extension can consist of a wing part and an actuating edge part.

In another advantageous embodiment of the invention an actuating element having actuating arms for the brake levers is provided, the said actuating element being mounted by means of a horizontal swivel axle on the cassette housing, and the actuating arms being arranged at least close to the ends of the swivel axle.

This advantageously shortens the actuating distances between actuating element and brake levers and provides more rapid brake actuation and the same braking reliability.

In another embodiment of the cassette, the swivel axle of the actuating element is provided on two bearing blocks on the cassette housing, and the actuating arms are arranged outside the bearing blocks.

A novel brake lever for a two-reel brake system for a tape cassette consists of, for example, a brake extension, an actuating extension and a swivel bush, the brake lever having a symmetrical shape with respect to the center plane at right angles to the longitudinal axis of the swivel bush.

A novel actuating element for a two-reel brake system for a tape cassette possesses, to permit mounting in the cassette housing, a swivel axle and actuating arms which are arranged at least close to the ends of the swivel axle.

A novel embodiment of the brake system for a two-reel tape cassette possesses two virtually identical brake levers, each of which has a brake extension, an actuating extension and a swivel bush and possesses a symmetrical shape with respect to the center plane at right angles to the longitudinal axis of the swivel brush, and a common actuating element is provided which has a horizontal swivel axle and actuating arms for the two brake levers, the actuating arms being arranged close to the ends of the swivel axle.

BRIEF DESCRIPTION OF THE DRAWINGS

Embodiments of the invention are illustrated in the drawing and described below.

DETAILED DESCRIPTION OF THE PREFERRED EMBODIMENT OF THE INVENTION

Figure 1:
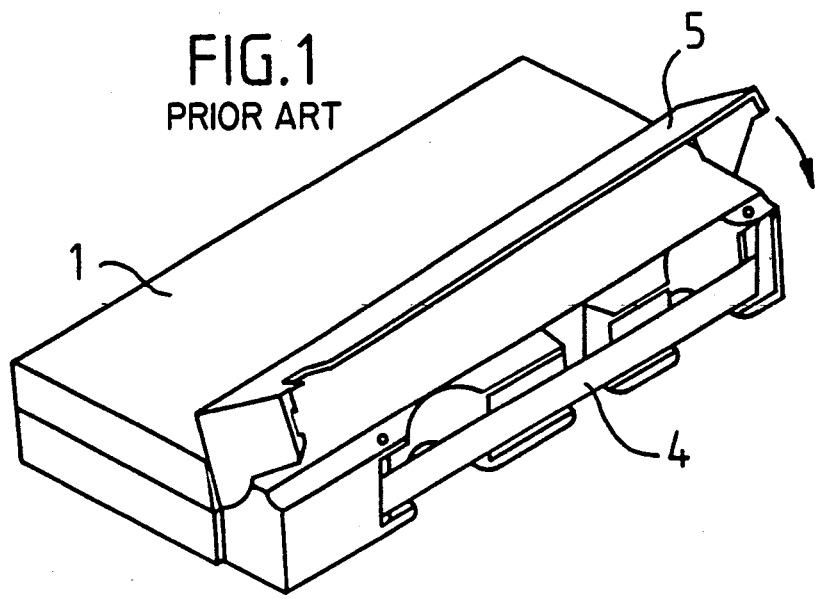
FIGS. 1 and 2 show an outer view and schematic plan view of a prior art video cassette.

A tape cassette, for example a VHS video cassette, consists of the housing 1, the front flap 5, the reels 2 and 3 and the magnetic tape 4. The lower flanges of the reels 2 and 3 have a toothed circumference which can be engaged in the braking position by the brake levers 6A and 6B, which are spring-loaded by pressure springs 8A and 8B and can be actuated by means of an actuating element 7 in the form of an angular lever. In the plan view in FIG. 2, the brake levers 8A and 8B appear interchangeable; FIG. 2A shows this to be incorrect since, relative to the center plane M (dashed line) at right angles to the longitudinal axis S of the swivel bush 9, both the brake are and the actuating arm are different. Hence, each brake lever 6A and 6B must be produced separately.

Figure 2:
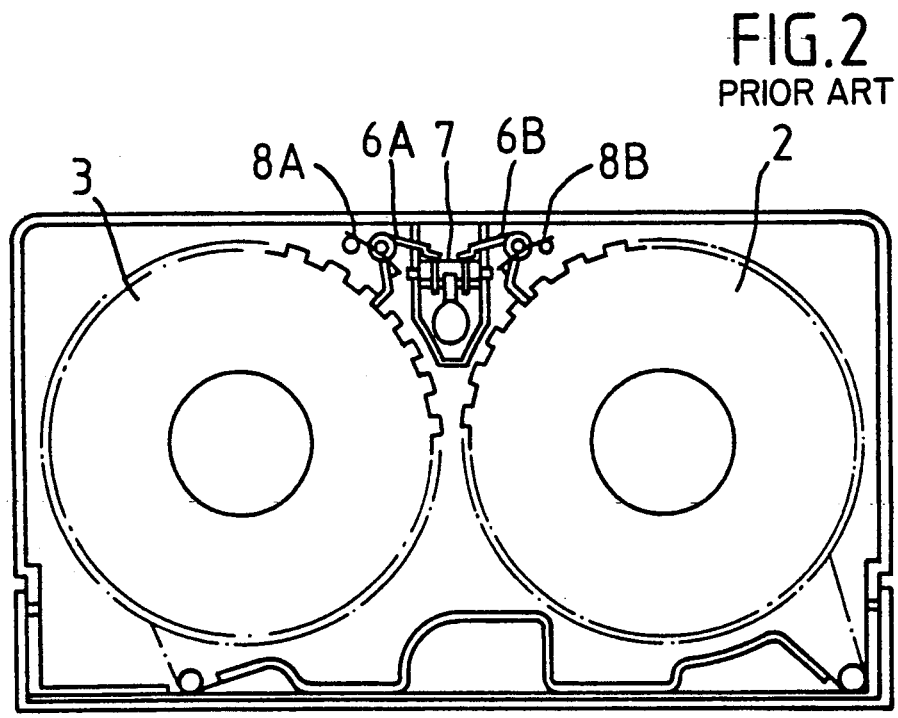
Figure 2A:
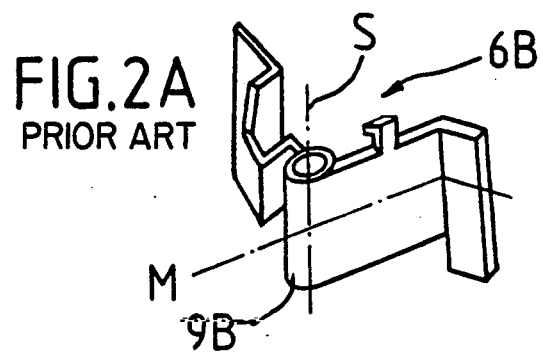
FIG. 2A shows a known brake lever in perspective view.
Figure 3:
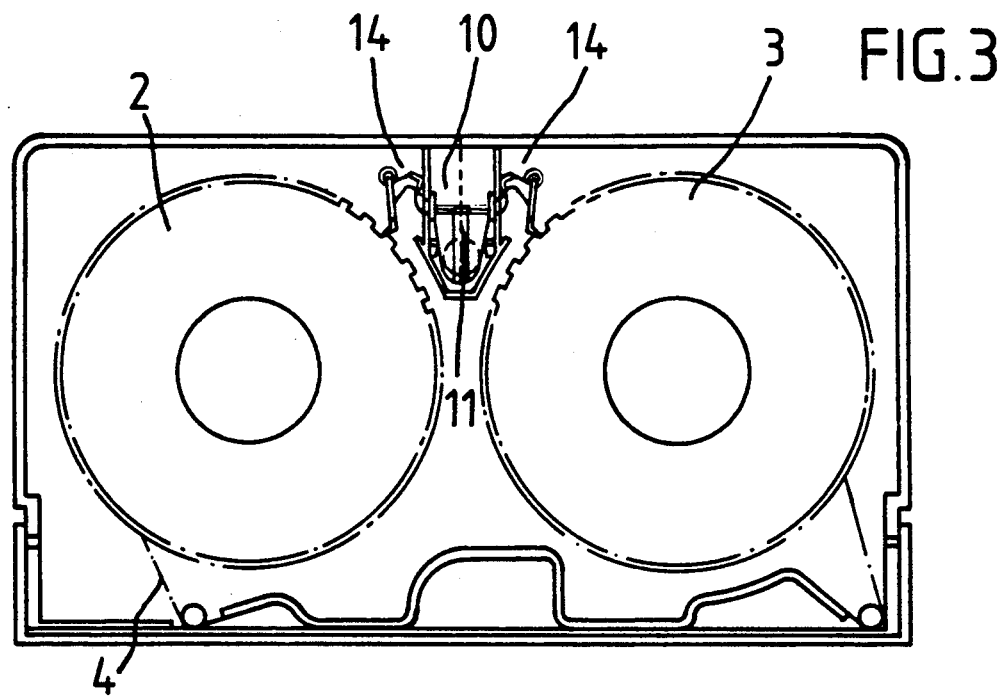
FIG. 3 shows a plan view of a tape cassette according to the invention.

FIG. 3 shows a plan view of a cassette as in FIG. 2, having a novel brake system 10. It consists of the actuating element 11 with swivel stubs 12, the actuating arms 13A and 13B and the brake levers 14, which are essentially identical. The brake lever consists of a brake extension or leg 15, an actuating extension or leg 16 and a swivel bush 17. The actuating extension 16 may furthermore consist of a wing part 16A and an edge part 16B (for actual actuation by the actuating arm 13).

Figure 5:
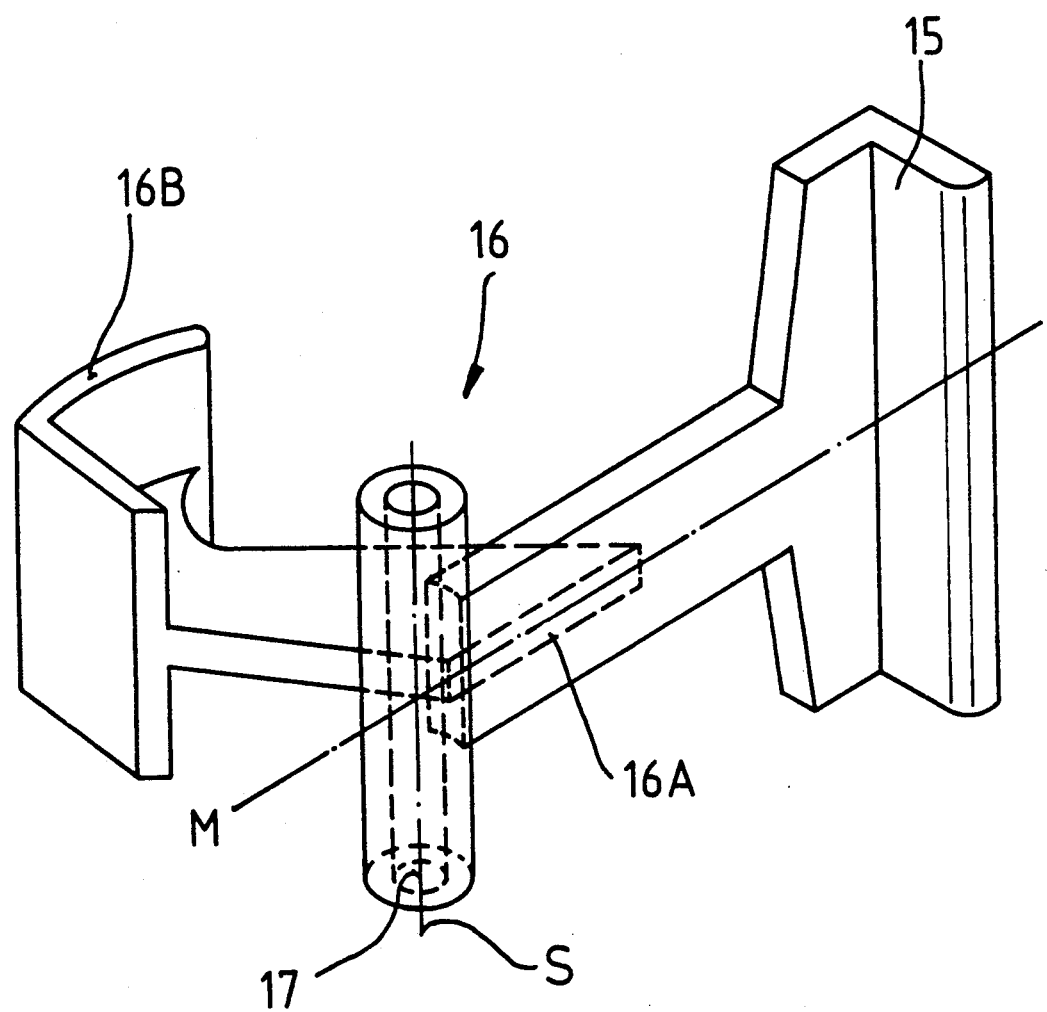

FIG. 5 shows that brake extension 15 and actuating extension 16 are symmetrical with respect to the center plane M which is at right angles to the swivel axis S of the bush 17.

Figure 4:
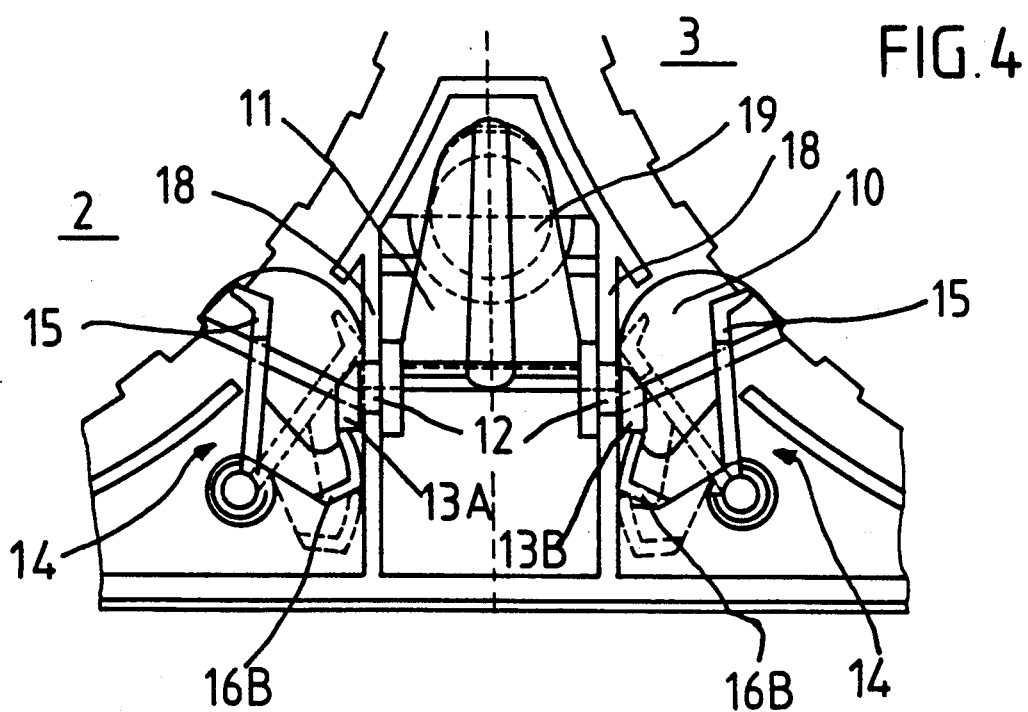
FIG. 4 shows a view of the novel brake system in a plurality of braking positions and FIG. 5 shows a novel brake lever in perspective view and on a larger scale.

The actuating element 11 is rotatably or, preferably, pivotably mounted by means of swivel stubs 12 on bearing blocks (webs 18 in FIG. 4). To trigger the rotational or pivotal movement, an actuating pin comes into contact with the actuating element 11 through an orifice 19 in the cassette housing.

FIG. 4 indicates, by showing the brake levers 14 as solid lines, the braking position in which the brake extensions 15 engage the toothed flanges of the reels 2 and 3 and the edge part 16B in contact with the particular actuating arm 13A and 13B. The position in which the brake levers 14 are disengaged from the reel flanges under the bias of the springs, which are not shown, is indicated by dashed lines.

In the embodiment, the actuating arms 13A and 13B are directly molded onto the axle stubs 12. Because of their external position, the necessary actuating distance and hence also the distance of movement of the brake levers are substantially smaller. The conventional plastic materials which are suitable for injection molding can be used for producing brake levers 14 and actuating element 11.

We claim:

1. A tape cassette having a two-reel brake system, substantially consisting of an actuating element and two rotatable brake levers which are associated with two reels, mounted with bias on a cassette housing and arranged for actuation by an actuating element, wherein the brake levers are of identical shape rather than being a mirror image of each other.

2. A cassette as claimed in claim 1, wherein the brake levers consist of a swivel bush and a brake leg and an actuating leg extending therefrom and are symmetrical with respect to a central plane extending longitudinally of said legs and at right angles to a longitudinal axis of the swivel bush.

3. A cassette as claimed in claim 1, wherein the actuating leg consists of a wing part and an actuating edge part.

4. A cassette as claimed in claim 1, comprising an axle extending parallel to a principal plane of said cassette housing, an actuating element having actuating arms for the brake levers, which is mounted on the cassette housing for swiveling movement by means of said axle and whose actuating arms are arranged adjacent a two free ends, respectively of said axle.

5. A cassette as claimed in claim 4, wherein the axle of the actuating element is provided on two bearing blocks, respectively, and the actuating arms are arranged adjacent free ends of the axle and axially outside the bearing blocks.

6. A tape cassette having a two-reel brake system, comprising an axle extending parallel to the principal plane of the cassette housing, two brake levers which are mounted on a cassette housing and are of identical shape rather than being a mirror image of each other, each of said levers having a swivel bush and a brake leg and an actuating leg extending therefrom, and possessing a symmetrical shape with respect to a central plane extending longitudinally of said legs and at right angles to a longitudinal axis of the swivel bush, and comprising a common actuating element mounted for swiveling movement on said axle and actuating arms for the two brake levers, the actuating arms being arranged adjacent to free ends of said axle.

7. A brake lever for a tape cassette as claimed in claim 6, comprising a swivel bush and a brake leg and an actuating leg extending therefrom, and possessing a symmetrical shape with respect to a central plane extending longitudinally of said brake lever and at right angles to the longitudinal axis of the swivel bush.

8. An actuating element for a two-reel brake system for a tape cassette as claimed in claim 6, comprising an axle extending parallel to a principal plane of the cassette housing, said actuating element being mounted for swiveling movement about said axle, and actuating arms which are arranged adjacent the free ends of said axle.

9. A brake system for a two-reel tape cassette, comprising two brake levers which are mounted on the cassette housing and are of identical shape rather than being the mirror image of each other, each of said brake levers having a swivel bush and a brake leg and an actuating leg extending therefrom, and possessing a symmetrical shape with respect to the central plane extending longitudinally of the brake leg and at right angles to a longitudinal axis of the swivel bush and comprising a common actuating element, mounted for swiveling movement on an axle extending parallel to a principal plane of the cassette housing and actuating arms for the two brake levers, the actuating arms being arranged adjacent to free ends of said swivel axle.

* * * * *

UNITED STATES PATENT AND TRADEMARK OFFICE
CERTIFICATE OF CORRECTION

PATENT NO. : 5,010,434

DATED : April 23, 1991

INVENTOR(S) : Klaus SCHOETTLE et al.

It is certified that error appears in the above-identified patent and that said Letters Patent is hereby corrected as shown below:

On the title page, item [30]:

That part reading "68805416[U] should read --G8805416[U]-

Signed and Sealed this

Eighth Day of September, 1992

Attest:

DOUGLAS B. COMER

Attesting Officer     Acting Commissioner of Patents and Trademarks